United States Patent
Rezk et al.

(10) Patent No.: US 11,226,414 B2
(45) Date of Patent: *Jan. 18, 2022

(54) COMBINING LASER PULSE TRANSMISSIONS IN LIDAR

(71) Applicant: Apple Inc., Cupertino, CA (US)

(72) Inventors: Mina A. Rezk, Los Gatos, CA (US); Jean-Marie Bussat, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/751,686

(22) Filed: Jan. 24, 2020

(65) Prior Publication Data

US 2020/0158871 A1    May 21, 2020

Related U.S. Application Data

(63) Continuation of application No. 15/275,090, filed on Sep. 23, 2016, now Pat. No. 10,545,238.

(60) Provisional application No. 62/232,867, filed on Sep. 25, 2015.

(51) Int. Cl.
   *G01C 3/08*     (2006.01)
   *G01S 17/10*    (2020.01)
   *G01S 7/486*    (2020.01)

(52) U.S. Cl.
   CPC .............. *G01S 17/10* (2013.01); *G01S 7/486* (2013.01)

(58) Field of Classification Search
   CPC ........... G01S 17/10; G01S 7/486; G01S 7/484
   See application file for complete search history.

(56) References Cited

U.S. PATENT DOCUMENTS

| | | |
|---|---|---|
| 5,250,810 A | 10/1993 | Geiger |
| 6,556,282 B2 | 4/2003 | Jamieson et al. |
| 7,349,094 B2 | 3/2008 | Harris et al. |
| 7,961,301 B2 | 6/2011 | Earhart et al. |
| 8,184,270 B1 | 5/2012 | Billmers et al. |
| 8,908,189 B2 | 12/2014 | Tumlinson |
| 9,971,025 B2 | 3/2018 | Fendt |
| 10,545,238 B1 * | 1/2020 | Rezk ..................... G01S 7/4815 |

FOREIGN PATENT DOCUMENTS

| | | | | |
|---|---|---|---|---|
| JP | 404223290 A | * | 8/1992 | ............. G01S 17/42 |
| WO | 2015043584 | | 4/2015 | |

* cited by examiner

*Primary Examiner* — Mark Hellner
(74) *Attorney, Agent, or Firm* — Robert C. Kowert; Kowert, Hood, Munyon, Rankin & Goetzel, P.C.

(57) ABSTRACT

A light ranging and detection (LiDAR) device may combine the transmission of laser pulses. Different trains of pulses from different transmitters may be combined and transmitted to an environment via a common optical path. The laser pulses transmitted from one train of pulses may be in a polarization state that is orthogonal to a polarization state for the laser pulses of the other train of pulses. Reflections for the different trains of pulses may be received via the common optical path and separated according to polarization state. Reflections of the train of pulses may be directed to one receiver and reflections of the other train of pulses may be directed to a different receiver. The transmission delta between the different trains of pulses may be dynamically configured. The pulse repetition rate of each train of pulses may also be configured.

20 Claims, 7 Drawing Sheets

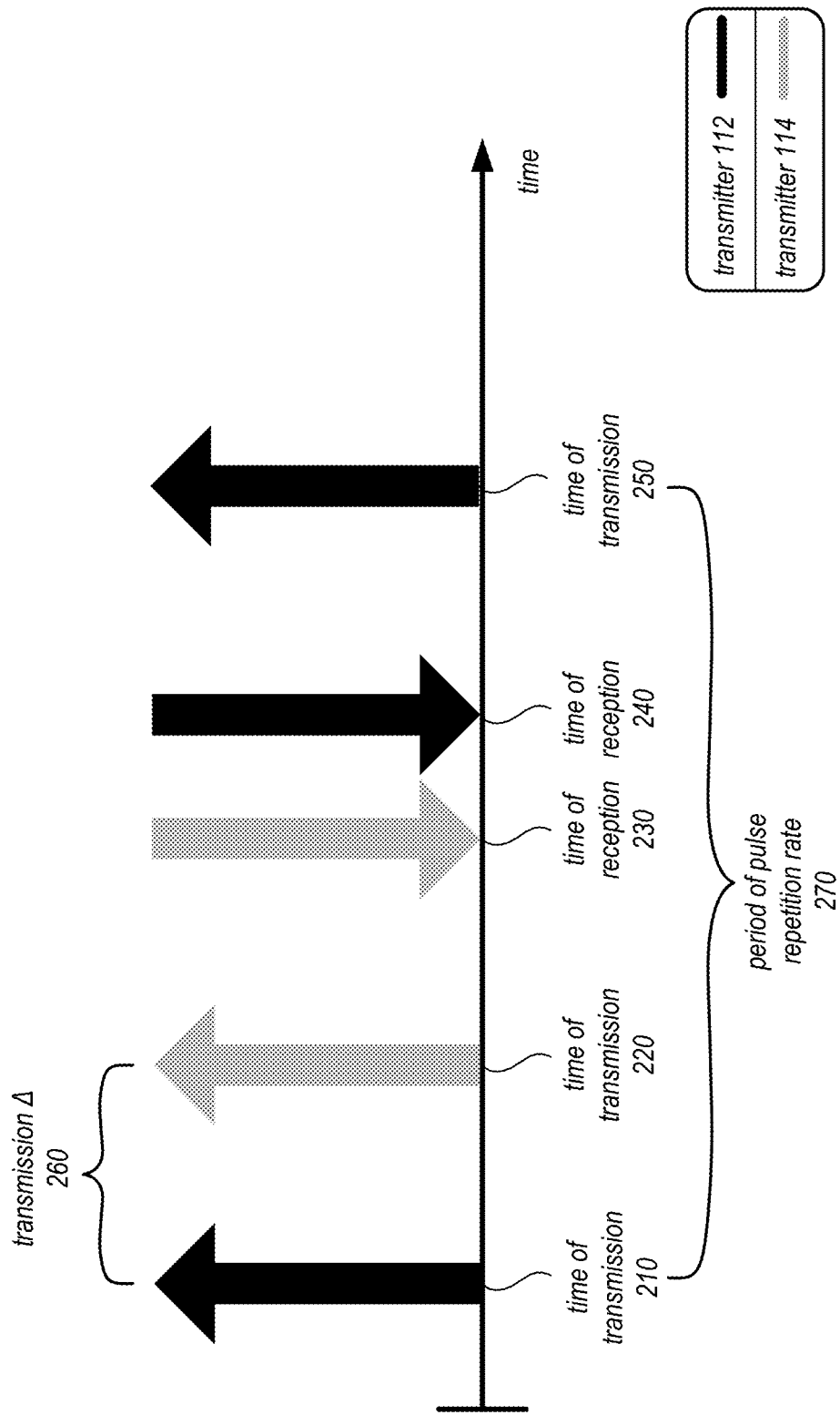

COMBINING LASER PULSE TRANSMISSIONS IN LIDAR

BACKGROUND

This application is a continuation of U.S. patent application Ser. No. 15/275,090, filed Sep. 23, 2016, which claims benefit of priority of U.S. Provisional Application Ser. No. 62/232,867, filed Sep. 25, 2015, which are hereby incorporated by reference herein in their entirety.

Remote sensing technologies provide different systems with information about the environment external to the system. Diverse technological applications may rely upon remote sensing systems and devices to operate. Moreover, as increasing numbers of systems seek to utilize greater amounts of data to perform different tasks in dynamic environments; remote sensing provides environmental data that may be useful decision-making. For example, control systems that direct the operation of machinery may utilize remote sensing devices to detect objects within a workspace. In some scenarios, laser based sensing technologies, such as light ranging and detection (LiDAR), can provide high resolution environmental data, such as depth maps, which may indicate the proximity of different objects to the LiDAR.

SUMMARY

A light ranging and detecting (LiDAR) device is described that combines laser pulse transmissions in a common optical path. Different laser transmitters may transmit respective trains of pulses which may be combined and separated in the optical path of the LiDAR according to the polarization state of the laser pulses. In this way different types of laser pulses may be combined, including laser pulses with different wavelengths, widths, or amplitudes. The transmission of laser pulses in the different trains of pulses may be dynamically modified to adjust the timing of when laser pulses are transmitted so that different scanning patterns may be implemented.

BRIEF DESCRIPTION OF THE DRAWINGS

FIG. 2 illustrates a processing timeline for different laser pulse transmissions combined in an optical path of a LiDAR, according to some embodiments.

Figure 1A:
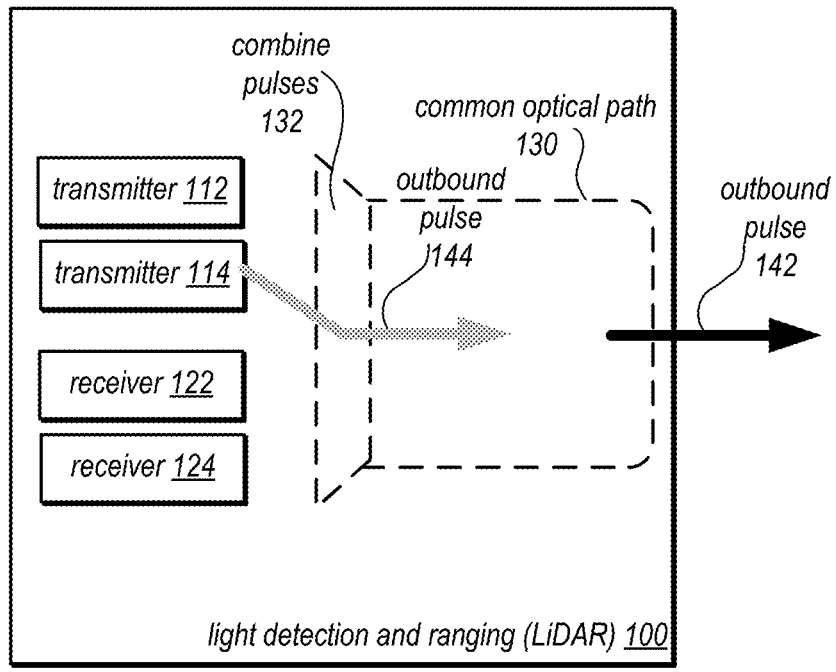
FIGS. 1A and 1B illustrate logical block diagrams of combining laser pulse transmissions in light ranging and detecting (LiDAR), according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement combining laser pulse transmission in light ranging and detection (LiDAR). LiDAR is a remote sensing technology that directs a laser at a target and measures a distance to the target according to a reflection of the laser detected at the LiDAR. The distance may be calculated based on the difference between the time at which a laser pulse transmission is sent and a time at which a reflection of the laser pulse transmission is received. Distance measures calculated by LiDAR are used in many different applications. For instance, multiple distance measures taken over an area can be processed to generate a high resolution map, which can be used in a variety of different applications, including, but not limited to, geological surveys, atmospheric measurements, object detection, autonomous navigation, or other remote environmental sensing. Note that the term "LiDAR" as used herein is sometimes designated or referred to in other texts differently, including such terms as "Lidar", "lidar", "LIDAR", or "light radar."

Different types of LiDAR utilize different techniques to transmit lasers and capture reflections of the lasers. Scannerless LiDAR (e.g., a time-of-flight camera) may transmit a single laser pulse to capture distance measurements for an entire scene. Scanning LiDAR may transmit a train of laser pulses via a moving scanning mirror that directs the train of laser pulses to different target points in an area in order to collect reflections of the different target points over the area. As distance measurements for the different points are determined, a scene may be incrementally captured.

Because scanning LiDAR collects information about a scene over a period of time, the speed at which a scene is captured may impact the utility of scanning LiDAR in different applications. In order to increase the speed at which a scene may be captured, the pulse repetition rate (PRR), which is also sometimes referred to as pulse repetition frequency, may be increased. For example, as the PRR is increased, the number of laser pulses transmitted in the train of pulses is increased. If movement of the scanning mirror is correspondingly increased, then the distance measures to be captured to render a scene may collected more quickly. The increase of PRR may also be desirable to increase the density of distance measures determined for a scene. Consider the scenario where an increase of PRR is performed but the movement of the scanning mirror stays the same. The targets of the train of pulses will be more closely spaced due to the greater number of pulse transmissions directed by the scanning mirror moving at the same speed.

Increasing PRR is not without cost. The range of a scanning LiDAR is inversely proportional to the PRR $$\left(\text{max range} = \frac{\text{speed of light}}{2 * PRR}\right)$$

in order to allow time for a reflection of a transmitted laser pulse in the train of pulses to be received prior to transmitting another laser pulse. Thus, increases to the PRR, whether to increase the speed at which a scene is scanned or to increase the density of distance measurements collected for a scene, may reduce the range of the LiDAR. In various embodiments, combining laser pulse transmissions from different laser pulse trains in LiDAR may allow for a greater number distance measures to be collected without reducing the maximum range of LiDAR.

Figure 1B:
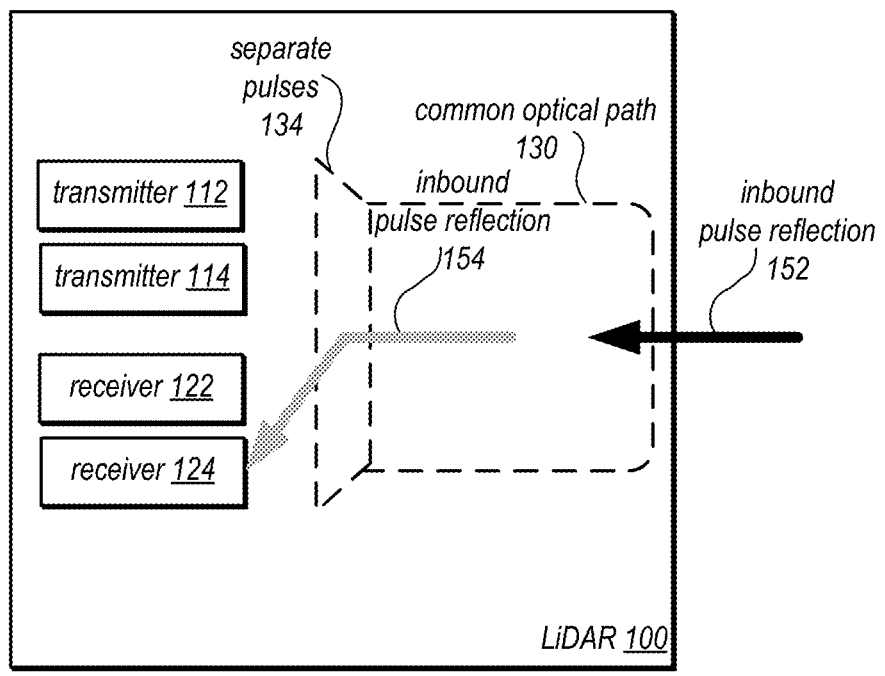

FIGS. 1A and 1B illustrate logical block diagrams of combining laser pulse transmissions in light ranging and detecting (LiDAR), according to some embodiments. In FIG. 1A, LiDAR 100 illustrates the combined transmission of two different pulses, outbound pulse 142 and 144 via a common optical path 130. LiDAR 100 may implement two laser transmitters 112 and 114. Each laser transmitter 112 and 114 may be configured to transmit a separate train of one or more laser pulses (the reflections of which may be captured to determine distance measurements). The type of laser pulses transmitted by the transmitters 112 and 114 may be the same or different. For example transmitter 112 may transmit a laser pulse with a same or different wavelength, pulse width, or amplitude than a laser pulse transmitted by transmitter 114. In addition the different types of laser pulses transmitted by transmitters 112 and 114, the timing of transmitting the laser pulses may be different. For example, in some embodiments, laser pulses from transmitter 112 may be transmitted according to one PRR (e.g., 1 megahertz), whereas laser pulses from transmitter 114 may be transmitted according to an increased or decreased PRR (e.g., 0.5 megahertz). Transmissions between the two transmitters may also be interleaved according to a transmission timing difference (i.e., delta) between the two laser transmitters.

LiDAR 100 may also implement a common optical path 130 which combines pulses 132 sent from the two different transmitters, transmitters 112 and 114. For example, as illustrated in FIG. 1A, outbound pulse 142 may be a pulse transmitted from transmitter 112 and outbound pulse 144 may be a pulse transmitted from transmitter 114 which are sent via the same optical path, common optical path 140. Different combinations of optical devices (e.g., lenses, beam splitters, folding mirrors, or other any other device that processes or analyzes light waves) may be implemented as part of common optical path 130 to combine pulses from transmitter 112 and 114 which may be transmitted with orthogonal polarizations (e.g., two different linear polarization states). For instance, laser pulses sent from transmitter 112 may have vertical polarization state and laser pulses sent from transmitter 114 may have a horizontal polarization state. To combine the pulses of orthogonal polarization states, the various combinations of optical devices in common optical path 130 may be implemented to ensure that polarization states of the two different laser pulses are distinguishable, both on transmission and reflection, in various embodiments. In this way, reflections of the different pulses received via common optical path 130 may be separated 134 (as illustrated in FIG. 1B) and directed to the appropriate receiver for calculating a distance measure particular to the pulse transmitted from a particular transmitter (e.g., pulse 142 transmitted from transmitter 112 may be matched with the detection of inbound pulse reflection 152 at receiver 122, and outbound pulse 144 may be matched with the detection of inbound pulse reflection 154 at receiver 124). FIGS. 4A-5B, discussed below, provide different examples of common optical paths which may be implemented.

As trains of laser pulses transmitted from transmitter 112 and 114 may be combined and transmitted via common optical path 130 the distance measures which can be captured by LiDAR 100 may vary. For instance, as the transmission delta between pulses may be configurable (as discussed below with regard to FIG. 7), the density or location distance measurements provided by LiDAR 100 may be changed accordingly. Similarly, the PPR for transmitter 112 may be slower to cover longer ranges. In some scenarios, transmitter 112 may be configured to provide long range distance measures and transmitter 114 may be configured to provide close range distance measures, effectively providing a larger range of distance measures (e.g., dynamic range) that may be determined by LiDAR 100. For example, transmitter 112 may send laser pulses with a 1550 nm wavelength for a larger range of distance measures and transmitter 114 may send laser pulses with a 930 nm wavelength to capture a close in range of distance measures.

FIG. 2 illustrates a processing timeline for different laser pulse transmissions combined in an optical path of a LiDAR, according to some embodiments. The time of transmission 210 for a laser pulse from transmitter 112 may be matched with the time of reception 240 in order calculate a distance measure based on the laser pulse. A time 250 of transmission for a next pulse from transmitter 112 may not occur until the period of PPR 270 has elapsed. During the period 270, transmission of a laser pulse from transmitter 114 may occur, at time 220 for example. The timing of transmission for a pulse from transmitter 114 may be dependent upon the time of transmission for a previous pulse from transmitter 112. This dependency may be enforced according to a transmission delta 260, which may indicate a period of time between transmissions of pulses from transmitter 112 and 114. The transmission delta may be adjusted to change the proximity of laser pulse transmissions. The smaller the transmission delta, the closer the target reached by a laser pulse from transmitter 114 may be to the target reached by a laser pulse from transmitter 112 (how close together may also be controlled by the speed at which a scanning mirror is moving). Note that processing of reflections is not affected by the order in which reflections are received. Because optical path 130 separates reflections 134 to direct them to the appropriate receiver, the time of reception for a reflection of a pulse from transmitter 114 may be received before a reflection of a pulse from transmitter 112 (as illustrated by times 230 and 240).

Figure 3:
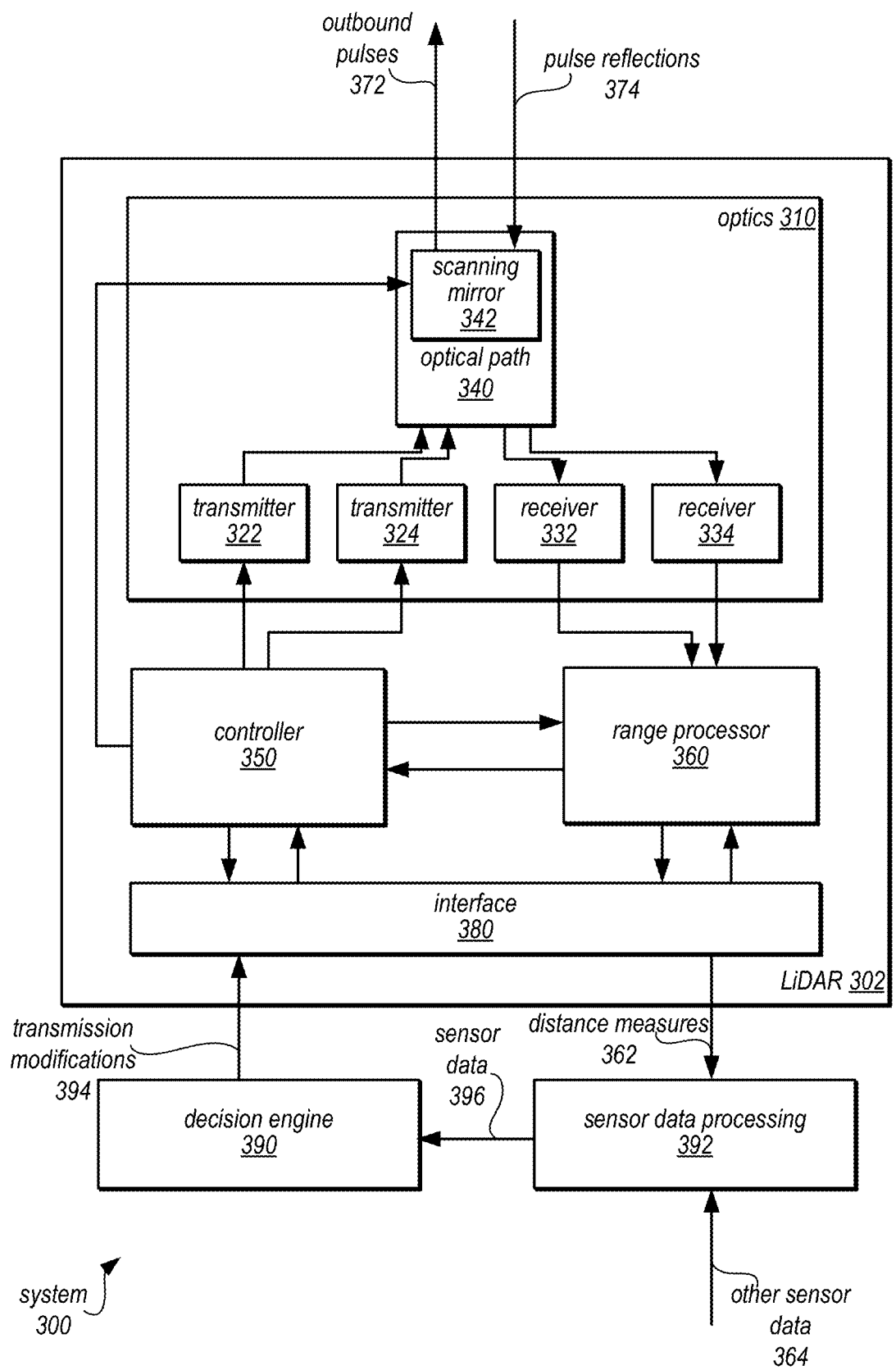
FIG. 3 illustrates a logical block diagram of a system that may implement a LiDAR that combines laser pulse transmissions, according to some embodiments.

LiDAR may be implemented in many different systems to provide remote sensing capabilities for a variety of different applications. FIG. 3 illustrates a logical block diagram of a system that may implement a LiDAR that combines laser pulse transmissions, according to some embodiments. System 300 may be implemented by one or more computing devices or dedicated hardware that implement sensor data processing 392 and decision engine 390 which may communicate with LiDAR 302 via wired or wireless communication techniques. For example, computing devices may be one or more of various types of computing devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device which communicates with LiDAR 302 via wired or wireless communications. Dedicated hardware may include various types of integrated circuits, such as application specific integrated circuit(s) (ASICs) or field programmable gate array(s) (FPGAs) to implement decisions engine 390 and/or sensor data processing 392 configured to interface with LiDAR 302. Alternatively, though not illustrated, the various capabilities, functionalities, and/or components of decision engine 390 and sensor data processing 392 may be implemented within LiDAR 302 to perform similar techniques as those described below. For example LiDAR 302 may include system memory, general purposes processors, and various interfaces to provide decision engine 390 and sensor data processing 392.

In some embodiments, a computing device implementing decisions engine 390 and/or sensor data processing 392 includes one or more processors coupled to a system memory via an input/output (I/O) interface. A computing device may further include a network interface coupled to the I/O interface, and one or more input/output devices, which can include one or more user interface (also referred to as "input interface") devices. In some cases, it is contemplated that embodiments may be implemented using a single instance of a computing device, while in other embodiments multiple such systems, or multiple nodes making up computing system, may be configured to host different portions or instances of decisions engine 390 and sensor data processing 392.

A computing device may be a uniprocessor system including one processor, or a multiprocessor system including several processors (e.g., two, four, eight, or another suitable number). Processors may be any suitable processor capable of executing instructions. For example, in various embodiments processors may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA.

A computing device may also implement system memory that may be configured to store program instructions, data, etc. accessible by a processor. In various embodiments, the system memory may be implemented using any suitable memory technology, such as static random access memory (SRAM), synchronous dynamic RAM (SDRAM), nonvolatile/Flash-type memory, or any other type of memory. Program instructions included in the system memory may be configured to implement some or all of decision engine 390 and/or sensor data processing 392, incorporating any of the functionality described below. In some embodiments, program instructions and/or data may be received, sent or stored upon different types of computer-accessible media or on similar media separate from the system memory.

The I/O interface of a computing device may be configured to coordinate I/O traffic between processor(s), system memory, and any peripheral devices in the device, including a network interface or other peripheral interfaces, such as input/output devices. In some embodiments, the I/O interface may perform any necessary protocol, timing or other data transformations to convert data signals from one component (e.g., system memory) into a format suitable for use by another component (e.g., a processor). In some embodiments, the I/O interface may include support for devices attached through various types of peripheral buses, such as a variant of the Peripheral Component Interconnect (PCI) bus standard or the Universal Serial Bus (USB) standard. For example, LiDAR 302 may be connected to a computing device implementing decision engine 390 and sensor data processing 392 utilizing a USB or PCI connection. A network interface may also be implemented to allow data to be exchanged between a computing device and other devices attached to a network (e.g., carrier or agent devices). For instance LiDAR 302 may be connected to a same network as a computing device implementing decisions engine 390 and/or sensor data processing 392 to provide distance measures 362 or receive transmission modifications 394.

Those skilled in the art will appreciate that the computing device described above is merely illustrative and is not intended to limit the scope of embodiments. In particular, the computing device may include any combination of hardware or software that can perform the indicated functions. A computing device may also be connected to other devices that are not illustrated or provide other functionalities not described.

Sensor data processing 392 may provide various types of remote sensor data processing utilizing distance measures obtained from LiDAR 302. For example, sensor data processing 300 may generate various image frames for each scan of a scene by LiDAR 302 which may be stored as video or still imagery. Sensor data processing 392 may also incorporate other sensor data 364 for processing. For instance, radar-based sensor data, image data, location data (e.g., global position satellite (GPS) data), or any other sensor information that may be incorporated to generate environmental maps, detect objects or perform decision making at decision engine 390. In at least some embodiments, sensor data processing 392 may perform various kinds of image processing techniques utilizing imagery generated from sensor data from LiDAR 302 and other sensor data 396, including, but not limited to, segmentation, edge analysis, color analysis, blob discovery, pattern recognition, character recognition or any other form of image analysis and manipulation.

Decision engine 390 may receive processed sensor data 396 to generate various system decisions affecting the operation of LiDAR, such as transmission modifications 394, or other sensing system or control systems not illustrated. In at least some embodiments, decision engine may detect various transmission modification events, such as those discussed below with regard to FIG. 7, in order to dynamically modify the transmission of laser pulses in LiDAR 302. For example, decision engine 390 may recognize various environmental conditions, such as rain, fog or time of day, and make transmission modifications accordingly. Decision engine 390 may access various sets of transmission modification event criteria which specify the conditions that trigger a transmission modification event (e.g., detected by analyzing processed sensor data 396). Decision engine 390 may also implement various machine learning and other statistical based decision making techniques in order to detect transmission modification events. Decision engine 390 may send requests or commands to LiDAR 302 in order to make transmission modifications 394 at LiDAR 302.

LiDAR 302 may be implemented by various combinations of hardware, software, and optical devices to implement different remote sensing techniques based on trains of outbound laser pulses 372 and corresponding pulse reflections 374. Interface 380 may be a physical and/or programmatic interface that provides access to direct or monitor the performance of LiDAR 302 as well as receive sensor data, such as distance measures 362. For example interface 380 may provide support for PCI, USB, or network-based connection to devices or components implementing decision engine 390 and sensor data processing 392. Interface 380 may also support a programmatic interface or format according to which distance measures 362 are sent out and transmission modification requests 394 are received (such as the various transmission modifications discussed below with regard to FIG. 7).

In various embodiments, LiDAR 302 may implement controller 350 to direct the transmission of laser pulses in optics subsystem 310. For example, controller 350 may determine the operation of scanning mirror 342 off which outbound pulses 372 and pulse reflections are reflected. Moreover, controller 350 may direct the transmission of laser pulses from transmitter 322 and 324 according to a PPR and/or transmission delta. For example, controller 350 may maintain state information describing the PPR and/or transmission delta for transmitting laser pulses. Controller 350 may also provide transmission information and scanning mirror information to range processor 360 in order for range processor 360 to synchronize the detection of reflections 374 with a previously sent outbound pulse 372. Controller 350 may be implemented as dedicated hardware and/or a combination of software executing on hardware to perform the various functions described above.

LiDAR 302 may implement range processor 360 which may receive information for receivers 332 and 334, indicating the detection of a pulse reflection 374 in order to calculate distance measures. Range processor 360 may be implemented in dedicated hardware, such as analogical or digital circuitry to process received information. For example, range processor 360 may be digital signal processor (DSP) which may receive digital information for the detected reflections, as well as corresponding information from controller 350 concerning the transmission of laser pulses to synchronize reflections with the corresponding pulses previously transmitted. As optical path 340 combines and separates the pulses in different trains of pulses, range processor 360 may be able to process the separate signal information from receiver 332 and receive 334 in parallel.

Optics 310 may implement different laser pulse transmitters, such as transmitter 322 and transmitter 324, to transmit different trains of pulses which are combined via optical path 340. Transmitters 322 or 324 may be configured to provide the same or different type of laser pulses, as noted above. For example, transmitters may transmit pulses of different wavelength, width, or amplitude. Transmitters may provide a laser pulse of different forms electromagnetic radiation, including, but not limited to, visible light, infrared light, or ultraviolet light. Transmitters may produce laser pulses according to various techniques, including optical amplification or optical oscillation. In various embodiments, transmitters 322 and 324 may only transmit laser pulses within eye safety standards. As discussed in the various examples below in FIGS. 4A-5B, laser pulses may be transmitted from the different transmitters as respective trains of pulses, which may be ultimately reflected into the environment by scanning mirror 342 in optical path 340. Scanning mirror 342 may be directed to move such that both azimuth and elevation are scanned by outbound pulses 372 and pulse reflections 374.

Optics 310 may implement receivers 332 and 334 to receive reflections of pulses 374 sent from a specific transmitter. For instance, receiver 332 may receive reflections for pulses sent from transmitter 322 and receiver 334 may receive reflections from pulses sent from transmitter 324. Receivers may be implemented in different ways in order to detect reflections of the type of laser pulse sent by a corresponding transmitter. Photo detection technologies, such as solid state photo detectors or photo multipliers may be implemented. Receivers 322 and 334 may provide indications of detected reflections to range processor 360 for distance measure calculation.

Figure 4A:
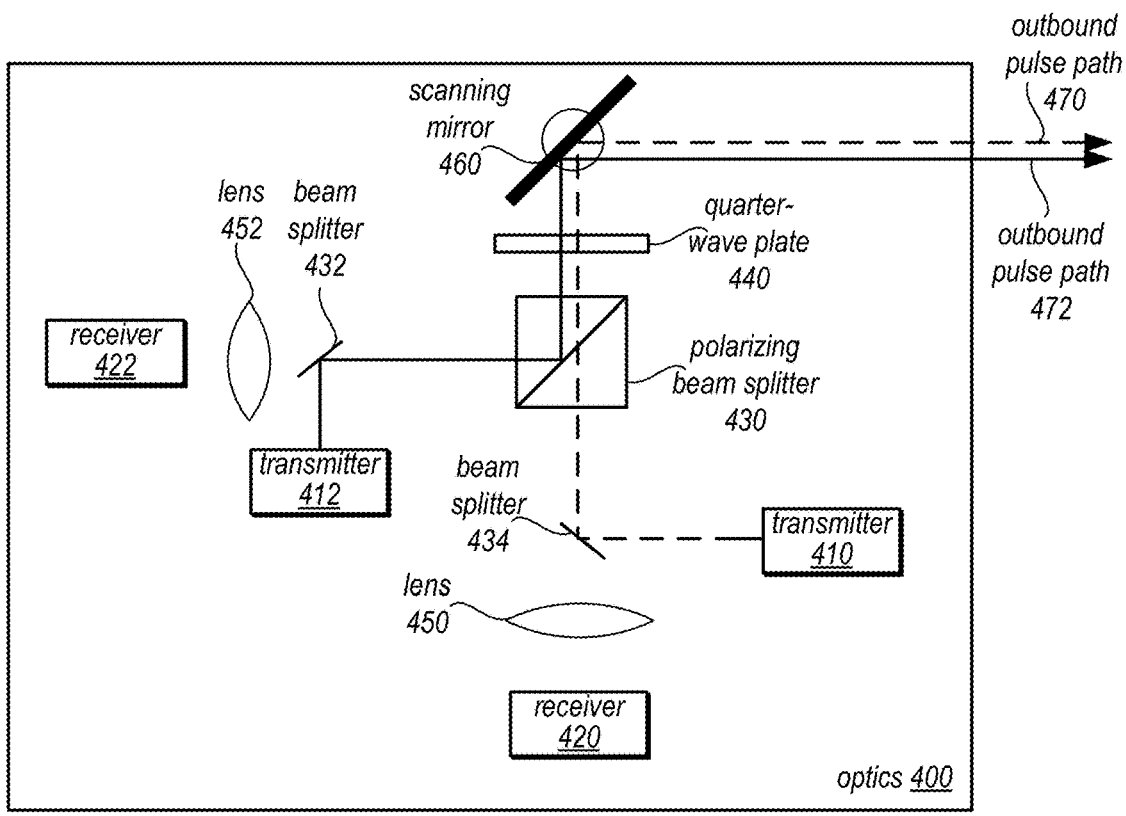
FIGS. 4A and 4B illustrate an example optical path for laser pulses and pulse reflections, according to some embodiments.
Figure 4B:
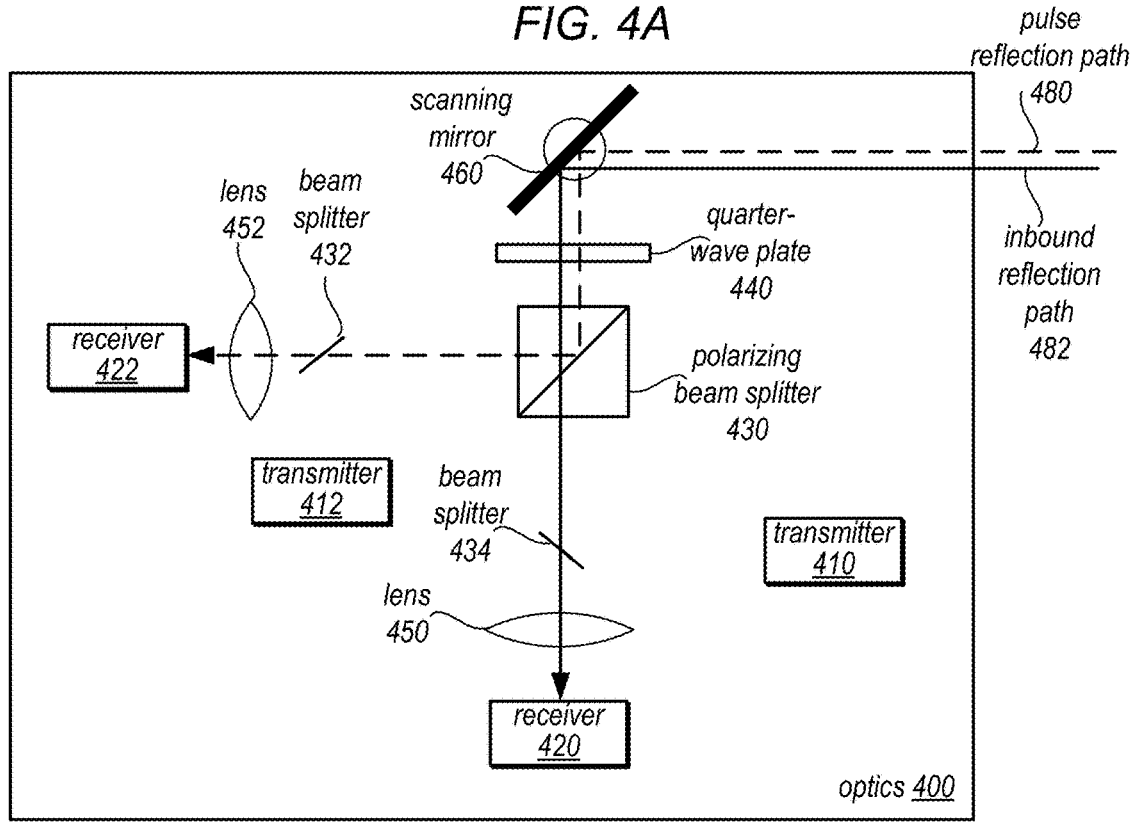

As noted above, different optical devices may be implemented to combine and separate laser pulses sent from different laser transmitters so that corresponding reflections are directed to the appropriate receivers. FIGS. 4A and 4B illustrate an example optical path for laser pulses and pulse reflections, according to some embodiments. In FIG. 4A, the outbound pulse path (470 and 472) for two different laser transmitters (410 and 412) is illustrated. Optics 400 may implement transmitter 410 which may send a laser pulse in a linear polarization state to beam splitter 434 which in turn may direct the pulse to polarizing beam splitter 430. Polarizing beam splitter 430 may direct the pulse through quarter wave plate 440, which may transform the polarization state from a linear polarization state to a circular polarization state. The transformed pulse may then be reflected off scanning mirror 460 out into the environment. Optics 400 may implement transmitter 412 which may send a laser pulse to beam splitter 432. The laser pulse sent from transmitter 412 may be in a linear polarization state orthogonal the polarization state of pulses sent from transmitter 410. Beam splitter 432 may direct the pulse to polarizing beam splitter 430. Polarizing beam splitter 430 may direct the pulse through quarter wave plate 440, which may transform the polarization state from a linear polarization state to a circular polarization state. The transformed pulse may then be reflected off scanning mirror 460 which may direct the pulse out into the environment.

In FIG. 4B, pulse reflection path 480 (which corresponds to reflections of pulses transmitted according to outbound pulse path 470) and pulse reflection path 482 (which corresponds to reflections of pulses transmitted according to outbound pulse path 472) are illustrated. A pulse reflection of a pulse transmitted by transmitter 410 may be received and reflected off scanning mirror 460, directing the pulse through quarter-wave plate 440. As the pulse was transmitted into the environment in a circular polarization state, the reflection may also be in a circular polarization state that is the reverse of the circular polarization state transmitted. For example, if outbound path 470 transmits laser pulses in right-handed circular polarization state, the corresponding reflections will be received in left-handed circular polarization state. Thus, when quarter-wave plate 440 transforms the polarization of the reflection the resulting linear polarization is orthogonal to the linear polarization state in which the laser pulse was originally transmitted from transmitter 410. Thus, partial beam splitter 430 directs the pulse through beam splitter 432 and receiver lens 452 in order to reach and be detected by receiver 422. A pulse reflection of a pulse transmitted by transmitter 412 may be received and reflected off scanning mirror 460, directing the pulse through quarter-wave plate 440. Again, the reflection may also be in a circular polarization state that is the reverse of the circular polarization state transmitted. For example, if outbound path 472 transmits laser pulses in left-handed circular polarization state, the corresponding reflections will be received in right-handed circular polarization state. Thus, when quarter-wave plate 440 transforms the polarization of the reflection the resulting linear polarization is orthogonal to the linear polarization state in which the laser pulse was originally transmitted from transmitter 412. Thus, the pulse passes through partial beam splitter 430, beam splitter 434, and receiver lens 450 in order to reach and be detected by receiver 420.

Figure 5A:
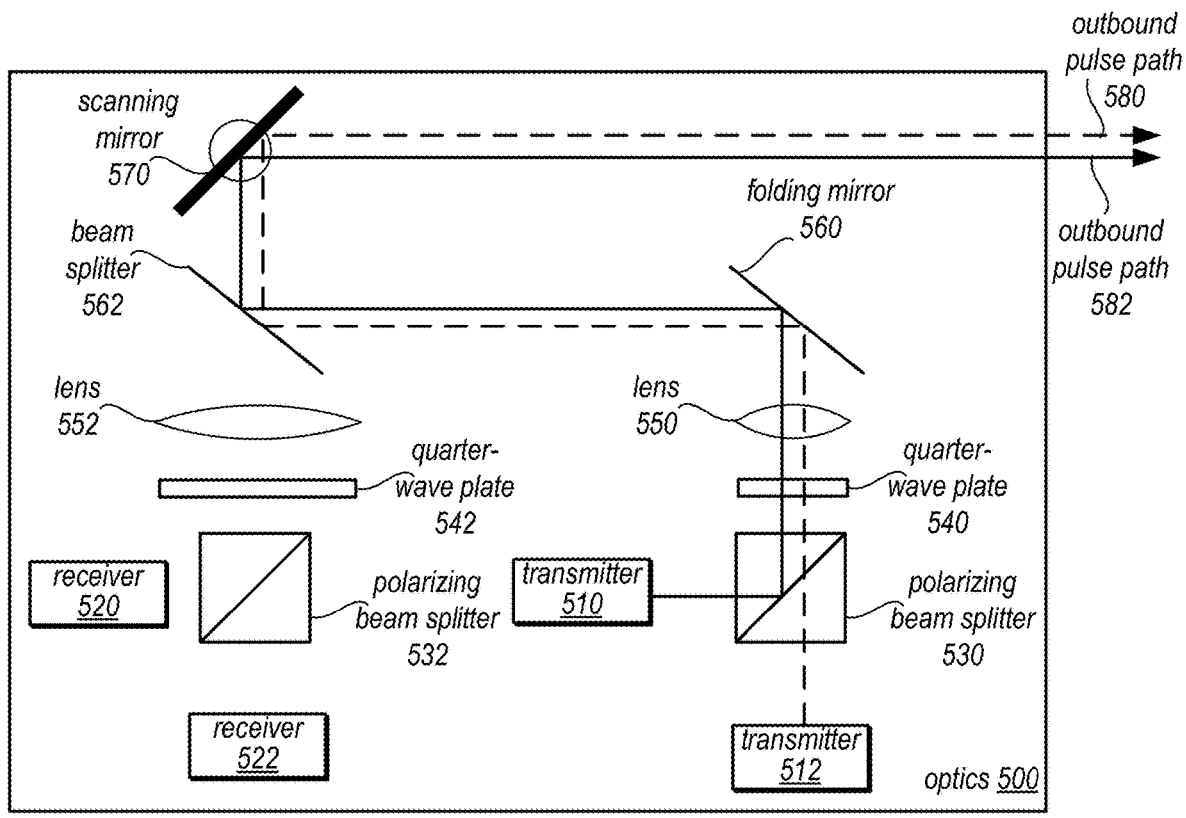
FIGS. 5A and 5B illustrate an example optical path for laser pulses and pulse reflections, according to some embodiments.
Figure 5B:
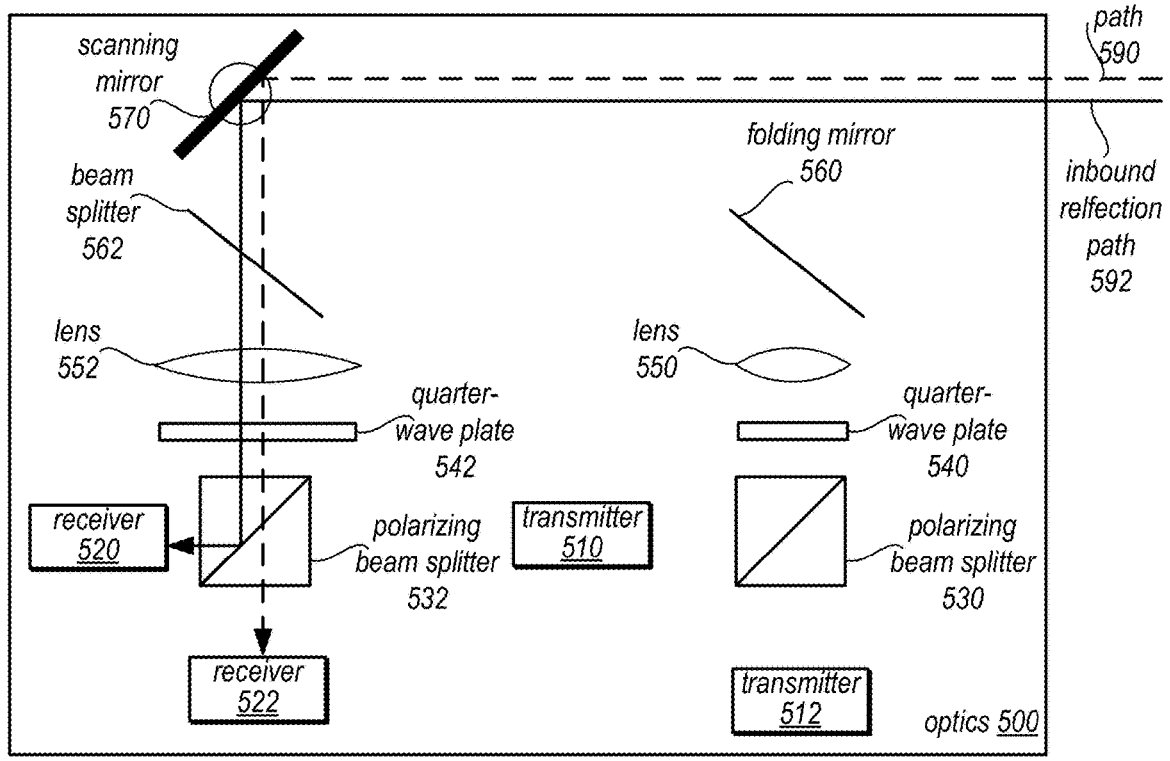

FIGS. 5A and 5B illustrate an example optical path for laser pulses and pulse reflections, according to some embodiments, which may implement different numbers and/or types of optical devices than those discussed above with regard to FIGS. 4A and 4B. In FIG. 5A, the outbound pulse path (580 and 582) for two different laser transmitters (510 and 512) is illustrated. Optics 500 may implement transmitter 510 which may send a laser pulse in a linear polarization state to polarizing beam splitter 530 which may reflect the pulse (according to the polarization state) through quarter-wave plate 540 and lens 550 to folding mirror 560. As discussed above in FIGS. 4A and 4B, a quarter-wave plate, such as a quarter-wave plate 540, may transform a linear polarization of the pulse into a circular polarization. Folding mirror 560 may direct the pulse to beam splitter 562, which in turn may direct the pulse to scanning mirror 570. The pulse may be reflected off scanning mirror 570 into the environment. Optics 500 may also implement transmitter 512 which may send a laser pulse in a linear polarization state to polarizing beam splitter 530. The laser pulse sent from transmitter 512 may be in a linear polarization state orthogonal to the polarization state of pulses sent from transmitter 510. Polarizing beam splitter 530 may pass the pulse (according to the polarization state) through quarter-wave plate 540 and lens 550 to folding mirror 560. Again, quarter-wave plate 540 may transform a linear polarization of the pulse into a circular polarization. Folding mirror 560 may direct the pulse to beam splitter 562, which in turn may direct the pulse to scanning mirror 570. The pulse may be reflected off scanning mirror 570 into the environment.

In FIG. 5B, pulse reflection path 590 (which corresponds to reflections of pulses transmitted according to outbound pulse path 580) and pulse reflection path 592 (which corresponds to reflections of pulses transmitted according to outbound pulse path 582) are illustrated. A pulse reflection of a pulse transmitted by transmitter 510 may be received and reflected off scanning mirror 570 which may direct the pulse through beam splitter 562, lens 552 and quarter-wave plate 542 to polarizing beam splitter 532. Polarizing beam splitter 532 may reflect the pulse (according to the polarization) to receiver 520. A pulse reflection of a pulse transmitted by transmitter 512 may be received and reflected off scanning mirror 570 which may direct the pulse through beam splitter 562, lens 552 and quarter-wave plate 542 to polarizing beam splitter 532. Polarizing beam splitter 532 may pass through the pulse (according to the polarization) to receiver 522.

The different configuration of optical devices in the illustrated optics 400 (in FIGS. 4A and 4B) and 500 (in FIGS. 5A and 5B), presents different opportunities to implement different types of laser pulses to be combined in a common optical path. For instance, optics 400 may have separate receiver lenses (450 and 452) which may allow for the utilization of laser pulses transmitted at different wavelengths. In optics 500, a common receiver lens 552 may be implemented as a large lens to capture reflections, which would not have to be duplicated due to the separation of pulses occurring after lens 552 at polarizing beam splitter 532. In some embodiments, the split ratio of a beam splitter, such as beam splitter 562 can be set to appropriately handle the power of pulse reflections (e.g., a 90/10 ratio). Various other properties, functions, or characteristics of optical devices may be implemented, which are different than, in addition to (or removed from) those illustrated in FIGS. 4A-5B, and thus the previous examples are not intended to be limiting as to the implementation of optics that combines laser pulse transmission in LiDAR.

Figure 6:
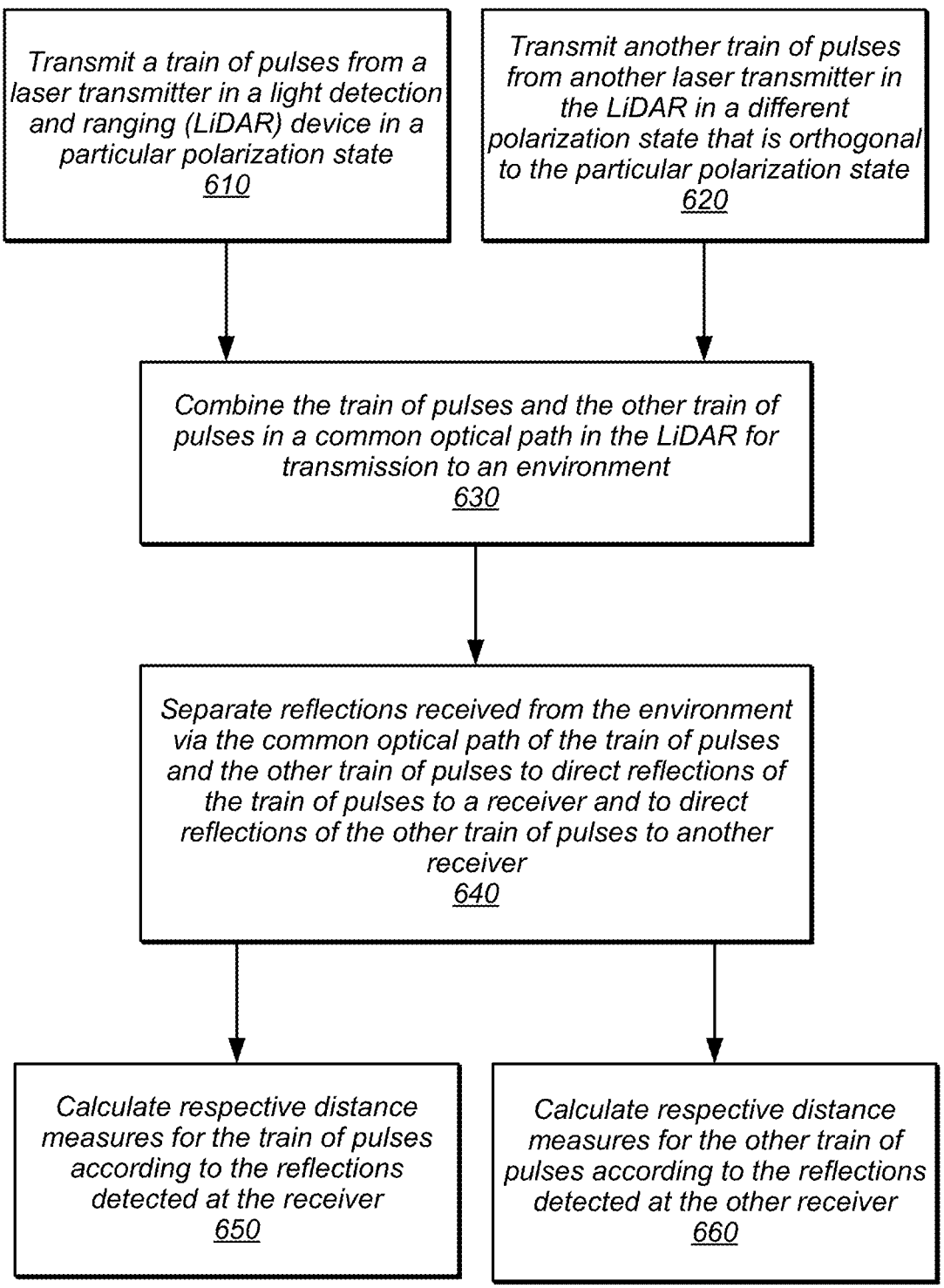
FIG. 6 is a high-level flowchart that illustrates various methods and techniques to combine laser pulse transmission in LiDAR, according to some embodiments.

FIGS. 2-5B provide examples of a system that may implement a LiDAR that combines laser pulse transmission, as well as various examples of optical paths that may be implemented to combine laser pulse transmissions. However, numerous other types or configurations of systems implementing LiDAR, LiDAR, or optical paths may combine laser pulse transmissions. FIG. 6 is a high-level flowchart that illustrates various methods and techniques to combine laser pulse transmission in LiDAR, according to some embodiments. The various components described above may implement these techniques (in addition to those described with regard to FIG. 7) as well as various other systems and LiDAR.

As indicated at 610, a train of pulses from a laser transmitter in a LiDAR device may be transmitted. The laser pulses may be transmitted in a particular polarization state (e.g., a linear polarization state, such as a vertical or horizontal polarization state). Similarly, as indicated at 620, another train of pulses from another laser transmitter may be transmitted. The laser pulses from the other laser transmitter may be transmitted in a different polarization state that is orthogonal to the polarization state of the laser pulses transmitted at 610. For instance, if laser pulses at 610 are in a horizontal polarization state, then laser pulses at 620 may be transmitted in a vertical polarization state (or vice versa).

The transmission of laser pulses in the trains of pulses at 610 and 620 may be performed independently or dependently. For example, the laser pulses of the train at 610 may transmitted according to one PRR (e.g., 0.7 Mhz), whereas the laser pulses of the train at 620 may be independently transmitted according to a different PRR (e.g., 1 Mhz). Laser pulse transmissions of one train of pulses may be dependent on another. For instance, a transmission delta as discussed above with regard to FIG. 2, may determine when to transmit an individual pulse in a train of pulses at 620 based on the most recently transmitted pulse in the train of pulses at 610. Once the period of time indicated by the transmission delta has elapsed from the transmission of the most recently transmitted pulse in the train of pulses at 610, a next pulse in the train of pulses at 620 may be sent. In this way, pulse transmissions between the two trains of pulses may be interleaved.

As indicated at 630, the train of pulses and the other train of pulses may be combined in a common optical path in the LiDAR for transmission to an environment. Different types of common optical paths may be implemented, as discussed above with regard to FIGS. 4A-5B. When laser pulse transmissions from the trains of pulses are combined, the polarization difference between the different trains of pulses may be preserved even though the polarization of the laser pulses may change in the common optical path. In this way, the pulses of the different trains may be distinguishable and separable, as discussed below at 640. For example, as discussed above with regard to FIGS. 4A and 5A, a quarter wave plate may be implemented in the common optical path which changes the polarization of a transmitted pulse from a linear polarization to a circular polarization. As the different polarizations of the different trains are orthogonal, the quarter wave plate may transform the polarity of a pulse from one laser transmitter into a left-hand circular polarity and the polarity of a pulse from the other laser transmitter into a right-hand circular polarity, maintaining a distinguishable difference between the polarities of the pulses in the different trains of pulses.

As indicated at 640, reflections may be received from the environment via the common optical that are reflections of the pulses in the train of pulses and the other train of pulses. The reflections may be separated and directed to different receivers, one receiver for laser pulses transmitted at 610 and another receiver for laser pulses transmitted at 620. The separation of the reflections may be performed according to the polarization state of the reflections, as the polarization state of reflections may ultimately correspond to the polarization state in which a laser pulse was initially transmitted (at 610 or 620 above). For example, if a reflection comes back in a right-handed circular polarization state, the common optical path may ultimately direct the reflection to a particular receiver (along with any other pulses received that are in right-handed circular polarization state) to capture the reflections of pulses transmitted at 610. Similarly, if a reflection comes back in a left-handed circular polarization state, the common optical path may direct the reflection to another receiver (along with any other pulses received that are in left-handed circular polarization state) to capture the reflections of pulses transmitted at 610.

As indicated at 650, respective distance measures may be calculated for the train of pulses (transmitted at 610) according to the reflections detected at the receiver for the train of pulses (transmitted at 610). Similarly, as indicated at 660, respective distance measures may be calculated for the train of pulses (transmitted at 620) according to the reflections detected at the receiver for the train of pulses (transmitted at 620). Distance measure determinations are based, at least in part, on the time between transmitting a laser pulse and receiving the corresponding reflection, and may be performed according to various techniques well-known to those of ordinary skill in the art. The calculated distance measures may be provided for various kinds of processing and analysis. For example a depth map for a scene may be rendered according to the distance measures calculated at different points in an environment. Image processing and analysis may then be performed on the depth map to detect objects, recognize certain conditions or environmental scenarios, or perform other remote sensing evaluation. Distance measures may also be performed to detect the location and/or velocity of objects in the environment, in some embodiments.

By combining laser pulse transmissions in a common optical path, distance measures can be captured using different types of laser pulse transmissions efficiently, utilizing the same scanning mirror. Consider a scenario where one laser transmitter may transmit laser pulses at a different wave length than the other laser transmitter. Such a configuration may have many different applications. In one example, the different wavelengths may offer different performance characteristics in different weather conditions. If, for instance, one laser transmitter transmitted pulses with a 950 nm wavelength, which attenuate less in foggy or misty weather conditions, the other laser transmitter can transmit pulses with a 1550 nm wavelength in order to provide a greater range to the LiDAR while maintaining transmissions of laser pulses that conform to an eye safety standard. In another scenario, one laser transmitter may transmit laser pulses at a different width than the other laser transmitter. Such a configuration may allow for different pulse widths to be utilized in order to capture the reflections of pulses from short and longer ranges with respect to the LiDAR. Amplitude differences may also be implemented for different laser transmitters so that receiver sensitivity and saturation avoidance can be configured.

Figure 7:
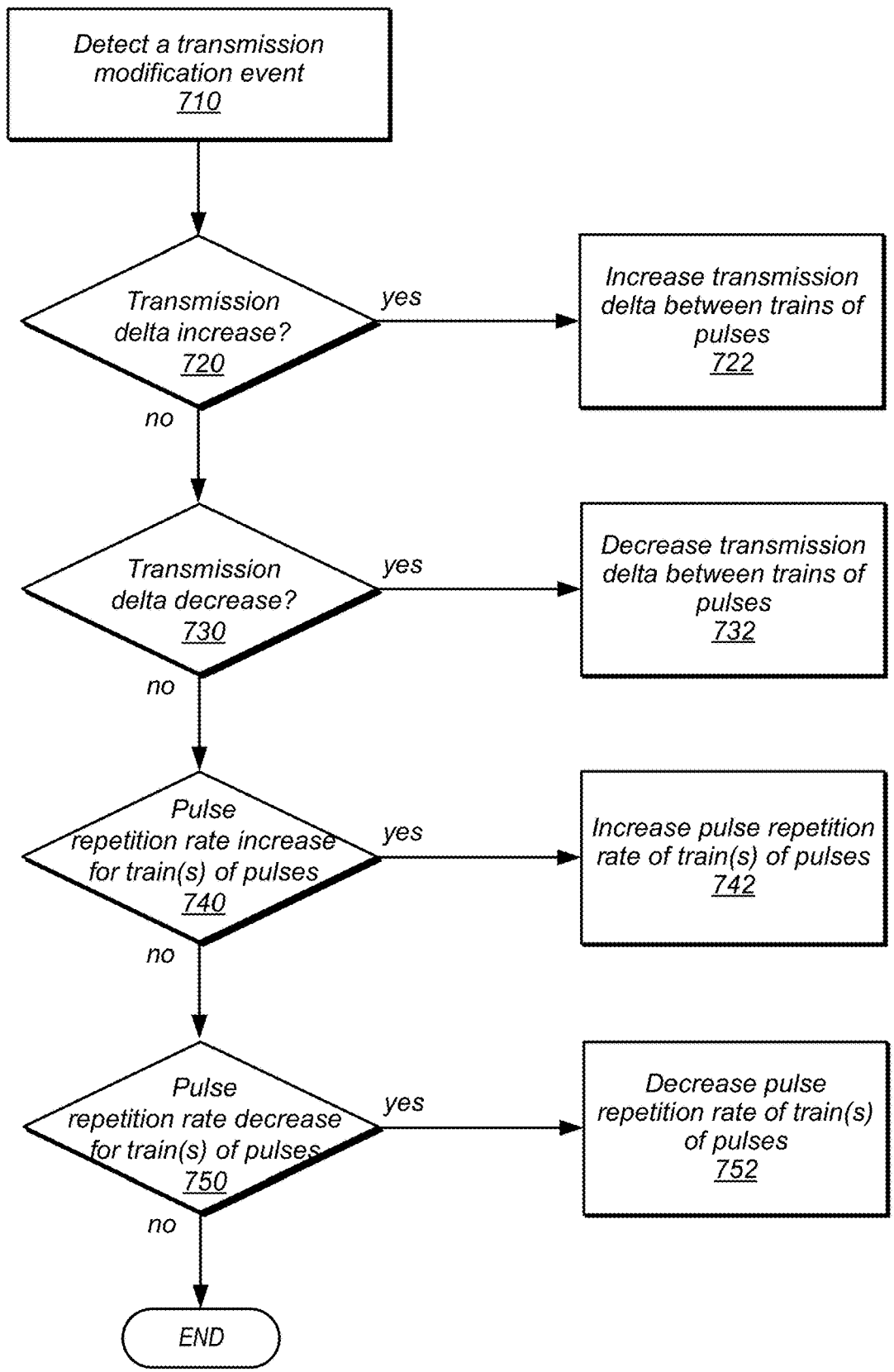
FIG. 7 is a high-level flowchart that illustrates various methods and techniques to dynamically adjust laser pulse transmissions, according to some embodiments.

In some embodiments, adjustments to laser pulse transmissions may be performed in order to collect different distance measures (e.g., for objects further away, in different environmental scenarios, or to change the scan resolution). Such adjustments may be dynamically performed to respond to changing conditions. For example, a LiDAR mounted on a moving vehicle may be configured to dynamically change laser pulse transmission in different environmental or traffic conditions. FIG. 7 is a high-level flowchart that illustrates various methods and techniques to dynamically adjust laser pulse transmissions, according to some embodiments.

As indicated at 710, a transmission modification event may be detected for transmission of laser pulses, in various embodiments. A transmission modification event may be specified by one or multiple event criteria which if satisfied direct one or multiple transmission modifications to perform. For example, a transmission modification event may be triggered by detecting or recognizing an object within a particular distance to the LiDAR (e.g., a number of distance measures calculated are determined to be less than 30 feet). Event criteria may include criteria determined based on environmental conditions (e.g., weather conditions), state or location of the LiDAR (e.g., moving fast, moving slow, or at rest), information determined from LiDAR distance measurements or other remote sensing devices (e.g., radar, video imagery) such as object detection and recognition, or any other criteria detectable for triggering a transmission modification event. Different transmission modifications may be specified for performance in response to detecting a transmission modification event, including the various examples discussed below with regard to elements 720-750.

In some embodiments, the LiDAR itself may include data processing and decision making capabilities, such as those discussed above with regard to decision engine 390 and sensor data processing 392 in FIG. 3, as part of processing and control capabilities (e.g., controller 350 and range processor 360) in order to detect transmission modification events. However, in some embodiments, other systems, such as system 300 in FIG. 3, may detect transmission modification events and may notify the LiDAR of the detected event and/or request the transmission modification(s) to perform (e.g., via an interface to the LiDAR, such as interface 380).

As noted above, different transmission modifications may be performed in response to a detected transmission modification event. For example, as indicated at 720, the transmission modification may be an increase to the transmission delta between laser pulses sent from different laser transmitters. Consider a transmission modification event that occurs in order to increase the density of the scanning pattern performed by the combined laser pulse transmissions from the LiDAR. In order to increase the density, the spacing of laser pulse transmissions may need to be increased so that the combined pulses are less closely spaced and can provide distance measures that capture different portions of a scene being scanned (in contrast with having combined laser pulse transmissions that are spaced close together capturing distance measures for nearly the same area in the scene). As indicated at 722, an increase in the transmission delta between trains of pulses may be performed. For example, state information maintained in a controller for the LiDAR which directs the transmissions of laser pulses in different trains of laser pulses may be updated to increase a transmission delta value maintained for directing laser pulse transmissions.

As indicated at 730, a transmission modification may be to decrease the transmission delta between laser pulses sent from different laser transmitters. Consider a transmission modification event that occurs in order to capture the velocity of an object. Typically, the location of such an object may have to be determined twice, utilizing two different distance measures. Instead of waiting for a first pulse to be sent to determine a distance measure for the object and waiting for the scanning mirror to return to a similar position in order sending another laser pulse to determine a second distance measure for the object, two closely spaced laser pulse transmissions may be sent to the object in order to get the two distance measures in one pass of the scanning mirror. The smaller the transmission delta, the more closely spaced the two laser pulses may be. Thus, a decrease in the transmission delta may be performed as a result of transmission modification event in order to closely space the combined laser pulse transmission to determine velocity of the object. As indicated at 732, a decrease in the transmission delta between trains of pulses may be performed. Similar to 722 above, state information maintained in a controller for the LiDAR which directs the transmissions of laser pulses in different trains of laser pulses may be updated to decrease a transmission delta value maintained for directing laser pulse transmissions.

As indicated at 740, the detected transmission event may direct a pulse repetition rate increase for one or more trains of pulses, in some embodiments. Consider a transmission modification event that occurs in order to change the detectable range of the LiDAR, such as detection of a close object (e.g., 6 meters distant from the LiDAR) indicating that further objects may be located even closer to the LiDAR which would be outside of a current detectable range for the LiDAR (e.g., objects less than 5 meters distant with the LiDAR have a current detectable range of 5 to 200 meters). In order to change the detectable range of the LiDAR to include closer objects, the PRR of one or both laser transmitters sending the trains of pulses may be increased (e.g., from 0.5 Mhz to 1 Mhz). In this way, the detectable range may be changed to detect the closer objects (e.g., to detect objects 1 meter or greater distant from the LiDAR). As indicated at 742, an increase in the PRR(s) for train(s) of pulses may be performed. For example, state information maintained in a controller for the LiDAR which directs the transmissions of laser pulses in different trains of laser pulses may be updated to increase a PRR value maintained for directing laser pulse transmissions.

As indicated at 750, the detected transmission event may direct a pulse repetition rate decrease for one or more trains of pulses, in some embodiments. Consider a transmission modification event that occurs in order to change the resolution of an image frame generated from the distance measures calculated from a scan of a scene by the LiDAR. It may be that the combined laser pulse transmissions previously scanned the scene to generate an image frame at a high resolution by performing a dense scan pattern with each laser transmitter sending a train of pulses at a same high PRR (e.g., 1 Mhz). Because the laser transmitters are operating at a high PRR, the detectable range of the LiDAR is smaller according to the limitations on LiDAR range as determined by PRR (discussed above with regard to FIG. 1). Thus, the transmission modification event may be performed to decrease the PRR (e.g., to 0.3 Mhz) for one of the laser transmitters so that the detectable range may be extended. In turn, the resolution of the image frame generated from the combined laser pulse transmissions may be reduced, as one of the laser transmitters does not provide as many distance measures for the image frame, but the detectable range of measures included to generate the image frame may be increased as a result of the extended range. As indicated at 752, a decrease in the PRR for one or more trains of pulses may be performed. Similar to 742 above, state information maintained in a controller for the LiDAR which directs the transmissions of laser pulses in different trains of pulses may be updated to decrease the PRR(s) maintained for the different trains of pulses.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A light detection and ranging (LiDAR) system, comprising:
   a laser transmitter, configured to transmit laser pulses in a particular polarization state;
   another laser transmitter, configured to transmit laser pulses in a different polarization state, wherein the different polarization state is orthogonal to the polarization state;
   an optical path;
   a controller, configured to direct transmission of a train of pulses from the laser transmitter via the optical path and another train of pulses from the other laser transmitter via the optical path, wherein the transmission of the other train of pulses from the other laser transmitter is interleaved with the transmission of the train of pulses from the laser transmitter, wherein:
      the controller directs the transmission of the train of pulses according to a pulse repetition rate and wherein the controller directs the transmission of the other train of pulses according to another pulse repetition rate that is different from the pulse repetition rate, or
      the controller directs the transmission of individual laser pulses of the other train of pulses according to a transmission delta between the individual laser pulses of the other train and individual laser pulses of the train of pulses;
   a laser receiver, configured to detect reflections of the train of pulses received at the LiDAR via the optical path;
   another laser receiver, configured to detect reflections of the other train of pulses received at the LiDAR via the optical path;
   wherein the optical path directs the reflections of the train of pulses to the laser receiver and the reflections of the train of other pulses to the other laser receiver according to the particular polarization state and the different polarization state; and
   a processor, configured to:
      determine respective distance measures for the train of pulses according to the detected reflections of the train of pulses; and
      determine other respective distance measures for the other train of pulses according to the detected reflections of the train of pulses.

2. The LiDAR of claim 1, wherein a wavelength for individual laser pulses of the train of pulses is different than a wavelength for individual laser pulses of the other train of pulses.

3. The LiDAR of claim 1, wherein the optical path comprises a receiver lens for the laser receiver and a different receiver lens for the other laser receiver.

4. The LiDAR of claim 1, wherein a pulse width for individual laser pulses of the train of pulses is different than a pulse width for individual laser pulses of the other train of pulses.

5. The LiDAR of claim 1, wherein an amplitude for individual laser pulses of the train of pulses is different than an amplitude for individual laser pulses of the other train of pulses.

6. The LiDAR of claim 5, further comprising an interface and wherein the controller is configured to:
   prior to the direction of the transmission of the train of pulses from the laser transmitter via the optical path and the direction of the other train of pulses from the other laser transmitter via the optical path, receive an indication of the transmission delta via the interface.

7. A method, comprising:
   combining, by a light ranging and detection (LiDAR) device, a train of pulses sent from a laser transmitter in the LiDAR with another train of pulses sent from another laser transmitter in the LiDAR in a common optical path in the LiDAR for transmission of the train of pulses and the other train of pulses to an environment, wherein the train of pulses are in a polarization state that is orthogonal to a different polarization state of the other train of pulses, wherein:
      transmission of individual laser pulses of the other train of pulses is performed according to a transmission delta between the individual laser pulses of the other train and individual laser pulses of the train of pulses, or
      the train of pulses are sent from the laser transmitter according to a pulse repetition rate and wherein the other train of pulses are sent from the other laser transmitter according to another pulse repetition rate that is different from the pulse repetition rate;
   separating, by the LiDAR, reflections received from the environment via the common optical path of the train of pulses from received reflections from the environment via the common optical path of the other train of pulses, wherein the separation directs the reflections of the train of pulses to a receiver and directs the reflections of the other train of pulses to another receiver, wherein the separation is performed according to a received polarization state of the reflections; and
   calculating, by the LiDAR, respective distance measures for:
      the train of pulses according to the reflections of the train of pulses detected at the receiver; and
      the other train of pulses according to the reflections of the other train of pulses detected at the other receiver.

8. The method of claim 7, wherein a pulse width for individual laser pulses of the train of pulses is different than a pulse width for individual laser pulses of the other train of pulses.

9. The method of claim 7, wherein a wavelength for individual laser pulses of the train of pulses is different than a wavelength for individual laser pulses of the other train of pulses.

10. The method of claim 7, further comprising modifying, at the LiDAR, the transmission delta such that subsequent transmission of the individual laser pulses of the other train of pulses is performed according to the modified transmission delta.

11. The method of claim 7, wherein an amplitude for individual laser pulses of the train of pulses is different than an amplitude for individual laser pulses of the other train of pulses.

12. The method of claim 11, further comprising:
detecting, by a computing device, a transmission modification event;
sending, by the computing device, a request to modify at least one of the pulse repetition rate or the other pulse repetition rate to the LiDAR; and
transmitting, by the LiDAR:
subsequent laser pulses in the train of pulses according to the modified pulse repetition rate; or
subsequent laser pulses in the other train of pulses according to the modified other pulse repetition rate.

13. The method of claim 12, wherein detecting the transmission modification event comprises detecting the initiation of data collection for a new image frame.

14. An apparatus, comprising:
a light detection and ranging (LiDAR) device, the LiDAR configured to:
transmit a laser pulse via an optical path in the LiDAR, wherein the laser pulse is in a polarization state;
subsequent to the transmission of the laser pulse, transmit another laser pulse via the optical path in a different polarization state, wherein the different polarization state is orthogonal to the polarization state, wherein:
the laser pulse is one of a train of pulses transmitted from the LiDAR according to a pulse repetition rate and wherein the other laser pulse is one of different train of laser pulses transmitted from the LiDAR according to a different pulse repetition rate, or
transmission of the other laser pulse is performed with respect to a transmission delta implemented between the other laser pulse and the laser pulse;
detect a reflection of the laser pulse via the optical path and a reflection of the other laser pulse via the optical path, wherein the optical path separates the reflection of the laser pulse and the reflection of the other laser pulse; and
calculate a distance measure for the laser pulse according to the reflection of the laser pulse; and
calculate a distance measure for the other laser pulse according to the reflection of the laser pulse.

15. The apparatus of claim 14, wherein an amplitude of the laser pulse is different than an amplitude of the other laser pulse.

16. The apparatus of claim 14, further comprising a sensor data processor, the sensor data processor configured to determine a velocity of an object according to the distance measure for the laser pulse and the distance measure for the other laser pulse.

17. The apparatus of claim 14, wherein a pulse width of the laser pulse is different than a pulse width of the other laser pulse.

18. The apparatus of claim 17, further comprising a decision engine, the decision engine configured to:
prior to the transmission of the train of pulses and the different train of pulses from the LiDAR:
detect a transmission modification event; and
in response to the detection of the transmission modification event, modify at least one of the pulse repetition rate or the different pulse repetition rate.

19. The apparatus of claim 14, wherein a wavelength of the laser pulse is different than a wavelength of the other laser pulse.

20. The apparatus of claim 19, further comprising a decision engine, the decision engine configured to:
detect a transmission modification event for the LiDAR; and
in response to the detection of the transmission modification event, modify the transmission delta such that a subsequent transmission of a different laser pulse in the different polarization state is performed with respect to the modified transmission delta implemented between the different laser pulse and another laser pulse in the polarization state transmitted prior to the different laser pulse via the optical path.

* * * * *